United States Patent
Furmanski

(10) Patent No.: US 10,131,579 B2
(45) Date of Patent: Nov. 20, 2018

(54) POLARITY-ENHANCED DUCTILE POLYMER FIBERS FOR CONCRETE MICRO-REINFORCEMENT

(71) Applicant: Jevan Furmanski, Califon, NJ (US)

(72) Inventor: Jevan Furmanski, Califon, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 0 days.

(21) Appl. No.: 14/983,771

(22) Filed: Dec. 30, 2015

(65) Prior Publication Data

US 2017/0190616 A1   Jul. 6, 2017

(51) Int. Cl.
*C04B 16/06* (2006.01)

(52) U.S. Cl.
CPC ...... *C04B 16/0633* (2013.01); *C04B 16/0616* (2013.01); *C04B 16/0625* (2013.01)

(58) Field of Classification Search
CPC . C04B 16/06; C04B 16/0616; C04B 16/0625; C04B 16/0633; C04B 16/0675
See application file for complete search history.

(56) References Cited

U.S. PATENT DOCUMENTS

| | | | |
|---|---|---|---|
| 3,887,530 | A | 6/1975 | O'Farrell et al. |
| 4,132,556 | A | 1/1979 | Camprincoli et al. |
| 4,255,540 | A | 3/1981 | Weiss |
| 4,306,911 | A | 12/1981 | Gordon et al. |
| 4,310,478 | A | 1/1982 | Balslev et al. |
| 4,410,586 | A | 10/1983 | Ladizesky et al. |
| 4,710,540 | A | 12/1987 | McAlphin et al. |
| 4,801,630 | A | 1/1989 | Chow et al. |
| 4,861,812 | A | 8/1989 | McAlphin et al. |
| 4,952,631 | A | 8/1990 | McAlphin et al. |
| 4,997,289 | A | 3/1991 | Sasaki et al. |
| 5,399,195 | A | 3/1995 | Hansen et al. |
| 5,502,160 | A | 3/1996 | Modrak |
| 5,705,233 | A | 1/1998 | Denes et al. |
| 5,753,368 | A | 5/1998 | Berke et al. |
| 5,817,415 | A | 10/1998 | Chou et al. |
| 6,001,476 | A * | 12/1999 | Selivansky ......... C04B 16/0691 428/395 |
| 6,069,192 | A | 5/2000 | Shalaby et al. |
| 6,308,777 | B2 | 10/2001 | Chatterji et al. |
| 6,569,233 | B2 | 5/2003 | Macklin et al. |
| 6,649,671 | B2 | 11/2003 | Pyzik et al. |
| 6,844,065 | B2 | 1/2005 | Reddy et al. |
| 6,969,423 | B2 | 11/2005 | Li et al. |
| 7,204,879 | B2 | 4/2007 | Zucker |
| 8,785,526 | B2 * | 7/2014 | Bassetti ............. C04B 16/0675 211/14 |
| 2002/0192449 | A1 | 12/2002 | Hobbs et al. |
| 2003/0056694 | A1 | 3/2003 | Macklin et al. |
| 2006/0078729 | A1 | 4/2006 | Yabuki et al. |
| 2006/0159904 | A1 | 7/2006 | Zucker |
| 2006/0188719 | A1 * | 8/2006 | Selivansky ......... C04B 16/0633 428/375 |
| 2006/0234048 | A1 | 10/2006 | Dallies et al. |
| 2015/0038618 | A1 | 2/2015 | Kawakami |

FOREIGN PATENT DOCUMENTS

| | | |
|---|---|---|
| CN | 1273952 A | 11/2000 |
| CN | 1405369 A | 3/2003 |
| CN | 1406900 A | 4/2003 |
| CN | 1407148 A | 4/2003 |
| CN | 1834050 A | 9/2006 |
| CN | 1915889 A | 2/2007 |
| CN | 1915890 A | 2/2007 |
| CN | 101481606 A | 7/2009 |
| CN | 101525453 A | 9/2009 |
| CN | 101525779 A | 9/2009 |
| CN | 103668550 A | 3/2014 |
| DE | 145921 A1 | 1/1981 |
| DE | 3210693 A1 | 10/1983 |
| DE | 3341462 A1 | 5/1985 |
| DE | 19860335 B4 | 12/1998 |
| EP | 1044939 A1 | 10/2000 |
| GB | 2021552 A | 12/1979 |
| GB | 2026379 B | 2/1980 |
| JP | 64033036 A | 2/1989 |
| JP | 1160850 A | 6/1989 |
| JP | 06135755 A | 5/1994 |
| JP | 07010620 A | 1/1995 |
| JP | 3570603 B2 | 4/1997 |
| JP | 2000061925 A | 8/1998 |

(Continued)

OTHER PUBLICATIONS

Machine translation of JP 10280279 A, 1998.*
Machine translation of JPH11350246, 1999.*
Felekoglu, Burak et al., "A comparative study on the flexural performance of plasma treated polypropylene fiber reinforced cementitious composites," Journal of Materials Processing Technology, 2009, vol. 209, pp. 5133-5144.
Yang, Zhiqian et al., "Application of nano-silica modified fiber in cementitious materials," Dongnan Daxue Xuebao, Ziran Kexueban, 2010, vol. 40, issue 2, pp. 49-55 (English Abstract).
Guerrini, G.L., "Applications of High-Performance Fiber-Reinforced Cement-Based Composites," Applied Composite Materials, 2000, vol. 7, pp. 195-207.
Li, Xiaoke et al., "A Review of Steel-polypropylene Hybrid Fiber Reinforced Concrete," Applied Mechanics and Materials, 2012, vol. 238, pp. 26-32.

(Continued)

*Primary Examiner* — Wenwen Cai
(74) *Attorney, Agent, or Firm* — Kristina Okafor; Robert A. Migliorini

(57) ABSTRACT

Cementitious mixtures, such as concrete, can be reinforced by adding one or more ductile but strong synthetic copolymer microfibers to the mixture. The synthetic copolymer microfibers improve local energy dissipation and bear load, taking the driving force for crack propagation away from the crack tip and thus reinforcing the cementitious mixture against the propagation of microscopic cracks. The resulting mixtures have an improved balance of strength properties.

13 Claims, No Drawings

(56) References Cited

FOREIGN PATENT DOCUMENTS

| JP | 10280279 A | * 10/1998 |
|---|---|---|
| JP | 11255544 A | 9/1999 |
| JP | 11350246 A | 12/1999 |
| JP | 3394738 B2 | 3/2000 |
| JP | 2000203918 A | 7/2000 |
| JP | 20001040575 A | 2/2001 |
| JP | 2001058858 A | 3/2001 |
| JP | 3295408 B2 | 6/2002 |
| JP | 4279016 B2 | 3/2003 |
| JP | 2003160365 A | 6/2003 |
| JP | 4397252 B2 | 2/2004 |
| JP | 2004059385 A | 2/2004 |
| JP | 2004059389 A | 2/2004 |
| JP | 2004137119 A | 5/2004 |
| JP | 2004168643 A | 6/2004 |
| JP | 2004168645 A | 6/2004 |
| JP | 2004175574 A | 6/2004 |
| JP | 3570603 B2 | 9/2004 |
| JP | 2006096565 A | 4/2006 |
| JP | 2006151792 A | 6/2006 |
| JP | 3980762 B2 | 9/2007 |
| JP | 4005276 B2 | 11/2007 |
| JP | 4021556 B2 | 12/2007 |
| JP | 4116704 B2 | 7/2008 |
| JP | 4860828 B2 | 1/2012 |
| JP | 4970675 B2 | 7/2012 |
| RU | 2165399 C1 | 4/2001 |
| SK | 201150034 A3 | 3/2013 |
| SK | 201150035 A3 | 3/2013 |
| WO | 87/04144 A1 | 7/1987 |
| WO | 89/02879 A1 | 4/1989 |
| WO | 94/20654 A1 | 9/1994 |
| WO | 99/19268 A1 | 4/1999 |
| WO | 03022774 A1 | 3/2003 |
| WO | 03/027038 A1 | 4/2003 |
| WO | 2004/033770 A1 | 4/2004 |
| WO | 2005/105686 A2 | 11/2005 |
| WO | 2006/016499 A1 | 2/2006 |
| WO | 2007/000086 A1 | 1/2007 |
| WO | 2013/129323 A1 | 9/2013 |
| WO | 2013/166568 A1 | 11/2013 |
| ZA | 8702484 A | 2/1988 |

OTHER PUBLICATIONS

Denes, F. et al., "Cementitious-matrix composites from SiCl4-plasma-activated polypropylene fibers," Journal of Adhesion Science and Technology, 1996, vol. 10, issue 1, pp. 61-77.
Fahmy, M.F. et al., "Chemical Treatments of Polypropylene Fiber Surfaces Used in Fiber Reinforced Concretes," Transportation Research Record, 1989, issue 1226, pp. 31-35.
Strand, D. et al., "Construction Applications of Polyolefin Fiber Reinforces Concrete," Materials for the New Millennium, Proceedings of the Fourth Materials Engineering Conference, 1996, Washington D.C.
Tatnall, P.C. et al., "Developments and applications of high performance polymer fibres in shotcrete," Proceedings of the International Conference on Engineering Developments in Shotcrete, Hobart, Tasmania, 2001.
Mishra, M.K., "Differential Scanning Calorimetric Studies of Plypropylene for Fibre Reinforced Concrete," Journal of the Institution of Chemists, 2005, vol. 77, issue 5, pp. 157-160.
Cun, Zhou et al., "Dispersing agent of polypropylene ultra-short fiber reinforced concrete," Journal of Southeast University (Natural Science Edition), 2010, vol. 40, issue 2, pp. 96-101 (English Abstract).
Zheng, Fengshi et al., "Effect of coupling agent combined with modified calcium carbonate on the performance of the UHMWPE fiber and its cement mortar," Hunningtu, 2013, vol. 11, issue 138, pp. 132-135 (English Abstract).

Nekkaa, S. et al., "Effect of Fiber Content and Chemical Treatment on the Thermal Properties of Spartium junceum Fiber-Reinforced Polypropylene Composites," International Journal of Polymeric Materials and Polymeric Biomaterials, 2008, vol. 57, issue 8, pp. 771-784.
Li, V.C. et al., "Effect of inclining angle, bundling and surface treatment on synthetic fibre pull-out from a cement matrix," Composites, 1990, vol. 21, No. 2, pp. 132-140.
Li, Guo-Zhong et al., "Effect of modified polypropylene fiber on mechanical properties of cement mortar," Jianzhu Cailiao Xuebao, 2010, vol. 13, issue 2, pp. 135-138 (English Abstract).
Li, Qijin et al., "Effects of modified polypropylene fibers on properties of foamed cement," Fuhe Cailiao Xuebao, 2013, vol. 30, issue 3, pp. 14-20 (English Abstract).
Li, Victor C. et al., "Effect of Plasma Treatment of Polyethylene Fibers on Interface and Cementitious Composite Properties", Journal of the American Ceramic Society, 1996, vol. 79, issue 3, pp. 700-704.
Payrow, Pouria et al., "Effect of surface treatment on the post-peak residual strength and toughness of polypropylene/polyethylene-blended fiber-reinforced concrete", Journal of Composite Materials, 2011, vol. 45, issue 20, pp. 2047-2054.
Tu, L. et al., "Effects of the increased fibre surface wettability on the polypropylene fibre-concrete interfacial bonding and the properties of the polypropylene fibre reinforced concrete," Second International RILEM Symposium on Adhesion between Polymers and Concrete, 1999, Dresden, Germany.
Wu, Hwai-Chung et al., "Fiber/cement interface tailoring with plasma treatment", Cement & Concrete Composites, 1999, vol. 21, pp. 205-212.
Thomas, J.A.G., "Fibre composites as construction materials", Composites, 1972, pp. 62-64.
Gray, R.J., "Fiber-matrix bonding in steel fiber-reinforced cement-based composites", Fracture Mechanics of Ceramics, 1986, vol. 7, pp. 143-155.
Lankard, David R., "Fiber Reinforced Cement-Based Composites", Ceramic Bulletin, 1975, vol. 54, issue 3, pp. 272-276.
Swamy, R.N., "Fibre reinforcement of cement and concrete", Materiaux et Constructions, 1975, vol. 8, issue 45, pp. 235-254.
Kopkane, Daniel et al., "Improvement of Mechanical Properties of Mortar Reinforced by Cold Plasma Treated Polypropylene Fibres", Advanced Science Letters, 2013, vol. 19, pp. 429-432.
Ke, Ding et al., "Improving the Interfacial Mechanical Property of Fiber Reinforced Cement with Dielectric Barrier Discharge 2: Morphological and Compositional Changes of the Fiber Surface", Journal of Dong Hua University, 2001, vol. 18, issue 1, pp. 32-37.
Novak, Igor et al., "Influence of surface modification on adhesive properties of polypropylene", Chemicke Listy , 1992, vol. 86, issue 9, pp. 672-680 (English Abstract).
Xing, Ming-Liang et al., "Influence of surface treatment of synthetic macro-fiber on strength of cement mortar", Guangxi Daxue Xuebao, Ziran Kexueban , 2013, vol. 38, issue 4, pp. 1003-1008 (English Abstract).
Ding, Xiao-Bo et al., "Influence of the surface modification on the properties of polypropylene fibers", Hunningtu, 2008, vol. 12, pp. 59-62 (English Abstract).
Li, Victor C. et al., "Interface Property Characterization and Strengthening Mechanisms in Fiber Reinforced Cement Based Composites", Advanced Cement Based Materials, 1997, vol. 6, issue 1, pp. 1-20.
Li, V.C. et al., "Interface Property Tailoring for Pseudo Strain-Hardening Cementitious Composites", Engineering Application of Fracture Mechanics, 1995, vol. 14, pp. 261-268.
Gao, De-Chuan et al., "Interfacial optimization of PP fiber reinforced cement composite treated by plasma", Jianzhu Cailiao Xuebao , 2001, vol. 4, issue 1, pp. 79-83 (English Abstract).
Zhang, Quan et al., "Latest research progress on polypropylene fiber cement-based material", Zhongguo Jiancai Keji, 2012, vol. 21, issue 1, pp. 72-75.
Shah, Surendra P. et al., "Mechanical Behavior of Fiber-Reinforced Cement-Based Composites", Journal of the American Ceramic Society, 1991, vol. 74, issue 11, pp. 2727-2738 and 2947-2953.

(56) References Cited

OTHER PUBLICATIONS

Ning, Chao et al., "Modification of Polypropylene Fibers by Acrylic Acid and Its Influence on the Mechanical Property of Cement Mortar", Advanced Materials Research, 2011, vols. 168-170, pp. 1459-1462.
Tosun, Kamile et al., "Multiple cracking response of plasma treated polyethylene fiber reinforced cementitious composites under flexural loading", Cement & Concrete Composites, 2012, vol. 34, pp. 508-520.
Shen, Rongxi, "New development of Chinese fiber reinforced cement based composites", Guisuanyan Tongbao, 2005, vol. 24, issue 5, pp. 55-59 (English Abstract).
Chou, Liang-Hsign et al., "On Improving PP Reinforced Cement-Based Composite", Advanced Science Letters, 2012, vol. 13, pp. 382-386.
Chou, L.H. et al., "On the Improvement of Fiber Reinforced Concrete through Surface Modification of Polypropylene by Grafting Method", Advanced Materials Research, 2011, vols. 194-196, pp. 1693-1696.
Hild, D.N. et al., "Plasma-treated ultra-high-strength polyethylene fibres improved fracture toughness of poly (methyl methacrylate)", Journal of Materials Science: Materials in Medicine, 1993, vol. 4, pp. 481-493.
Zhang, C. et al., "Plasma Treatment of Polymeric Fibers for Improved Performance in Cement Matrices", Journal of Applied Polymer Science, 2000, vol. 76, pp. 1985-1996.
Feldman, D. et al., "Polypropylene fiber-matrix bonds in cementitious composites", Journal of Adhesion and Science Technology, 2000, vol. 14, issue 13, pp. 1705-1721.
Ma, Zhaoli et al., "Polypropylene fiber modified by surface crosslinking in dielectic barrier discharge", Surface & Coatings Technology, 2007, vol. 201, pp. 4935-4938.
Rashitov, R.D., "Polypropylene fibers for concrete reinforcement", Tsement i Ego Primenenie, 2007, vol. 5, pp. 56-57 (English Abstract).
He, Wenmin et al., "Progress of polypropylene fibre reinforced concrete", Huagong Xinxing Cailiao, 2013, vol. 41, issue 3, pp. 130-132 (English Abstract).
Wang, Wei et al., "Progress of the Surface Modification of PP Fiber Used in Concrete", Polymer-Plastics Technology and Engineering, 2006, vol. 45, issue 1, pp. 29-34.
Ju, Liyan et al., "Properties and application of polypropylene fiber in concrete", Hecheng Xianwei Gongye, 2004, vol. 27, issue 1, pp. 35-37 (English Abstract).
Fu, He-Qing et al., "Property of polypropylene fiber and its application in cement", Huaxue Gongye Yu Gongcheng, 2004, vol. 21, issue 6, pp. 457-460 (English Abstract).
Johnston, C.D., "Proportioning, mixing and placement of fibre-reinforced cements and concretes", RILEM Proceedings, 1996, 32 (Production Methods and Workability of Concrete), pp. 155-179.
Zhou, Zhengya et al., "Research progress and application of polypropylene fiber used in concrete", Xiandai Suliao Jiagong Yingyong, 2006, vol. 18, issue 1, pp. 62-64 (English Abstract).
Yang, Zhiqian et al., "Silica modified PP fiber for improving crack-resistance of cementitious composites", Advanced Materials Research, 2011, vols. 332-334, pp. 2058-2064.
"State-of-the-Art Report on Fiber Reinforced Shotcrete", Concrete International, 1984, vol. 6, issue 12, pp. 15-27.
Chen, Run-Feng et al., "Status and application of synthetic fiber reinforced concrete in China", Jianzhu Cailiao Xuebao, 2001, vol. 4, issue 2, pp. 167-173 (English Abstract).
Chou, Liang-Hsing et al., "Studies on improving PP finer reinforced concrete", Advanced Materials Research, 2011, vols. 250-253, pp. 678-681.
Zhang, Li-He et al., "Study on interface bonding of PP fiber-cement and antishrinkage performance", Jianzhu Cailiao Xuebao, 2001, vol. 4, issue 1, pp. 17-21 (English Abstract).
Sobolev et al., "Superhydrophobic Engineered Cementitious Composites for Highway Bridge Applications: Phase II", National Center for Freight & Infrastructure Research & Education, 2013, University of Wisconsin, Milwaukee.
Li, Qijin et al., "Surface modification of polypropylene fibers by chemical grafting methods to reinforce the interfacial bonding of cement-based composites", Fuhe Cailiao Xuebao, 2013, vol. 30, issue 4, pp. 238-244 (English Abstract).
Tu, L. et al., "Surface modified polypropylene fibres for use in concrete", Magazine of Concrete Research, 1998, vol. 50, issue 3, pp. 209-217.
Lopez-Buendia, Angel M. et al., "Surface treated polypropylene (PP) fibres for reinforced concrete", Cement and Concrete Research, 2013, vol. 54, pp. 29-35.
Ogihara, Takashi et al., "Surface treatment on polypropylene fibers by sol-gel method and effect of coating on the concrete strength", Semento, Konkurito Ronbunshu, 2000, vol. 54, pp. 141-146 (English Abstract).
Ogihara, Takashi et al., "Surface treatment on polypropylene fibers by sol-gel method and effect of coating on the concrete strength", Sen'i Kogyo Kenkyu Kyokai Hokoku, 2001, vol. 11, pp. 19-22 (English Abstract).
Romero-Sanchez, M.D. et al., "Surface treatments of polypropylene fibres (PP) to improve adhesion to concrete", Proceedings of the Annual Meeting of the Adhesion Society, 2007, 30th, pp. 251-253.
Pei, Meishan et al., "Surface Treatments of Subdenier Monofilament Polypropylene Fibers to Optimize Their Reinforcing Efficiency in Cementitious Composites", Journal of Applied Polymer Science, 2004, vol. 92, pp. 2637-2641.
Zheng, Zhihong et al., "Synthetic fibre-reinforced concrete", Progress in Polymer Science, 1995, vol. 20, issue 2, pp. 185-210.
Ostertag, C.P. et al., "Tensile strength enhancement in interground fiber cement composites", Cement & Concrete Composites, 2001, vol. 23, pp. 419-425.
Wang, Y., "Toughness characteristics of synthetic fibre-reinforced cementitious composites", Fatigue & Fracture of Engineering Materials & Structures, 1998, vol. 21, pp. 521-532.
Peled, A. et al., "Treatments of polypropylene fibres to optimize their reinforcing efficiency in cement composites", Cement & Concrete Composites, 1992, vol. 14, pp. 277-285.
Tu, L. et al., "Wettability of surface fluorinated polypropylene fibres and its effect on interfacial bonding with cementitious matrix", Proceedings of the International Conference on Composite Science and Technology, 1996, Durban, South Africa.
Tu, L. et al., "Wettability of Surface Oxyfluorinated Polypropylene Fibres and Its Effect on Interfacial Bonding with Cementitious Matrix", Journal of Adhesion, 1997, vol. 62, pp. 187-211.
Katz, "Effect of Fiber Modules of Elasticity on the Long Term Properties of Micro-fiber Reinforced Cementitious Composites", Cement and Concrete Composites, Jan. 1, 1996, pp. 389-399, vol. 18, No. 6, Elsevier.
Partial International Search Report and Written Opinion PCT/US2016/068500 dated Mar. 14, 2017.

\* cited by examiner

POLARITY-ENHANCED DUCTILE POLYMER FIBERS FOR CONCRETE MICRO-REINFORCEMENT

FIELD

This disclosure relates to concrete mixtures containing ductile reinforcing microfibers and to processes of reinforcing concrete matrices against propagation of microscopic cracks by incorporating copolymer microfibers into the concrete pre-mixture.

BACKGROUND

Concrete lifetime, durability, and toughness is limited by its resistance to the formation and coalescence of microscopic cracks in the portland cement. These are exacerbated by freeze-thaw cycles and water intrusion/migration. By itself, concrete has a limited local fracture resistance owing to little energy being consumed by damage in the volume of material around a brittle failure.

Fibrous reinforcement is a well-known method for improving the physical properties of cement and concrete structures, such as for the production of pipes, corrugated boards, roofing slates, machine foundations, storage tank walls, reactors, aircraft runways, roads, pilings and many other high strength articles.

Of the fibers currently used for cement reinforcement, polyacrylonitrile and polyvinyl alcohol fibers are preferred because they combine high fiber strength with good adhesion to a cement matrix. Unfortunately, both are expensive materials and significantly increase the cost of producing fiber reinforced cement structures. A variety of other less-expensive materials have been considered for production of cement reinforcement fibers. Steel fibers have been tried and found inadequate because they suffer from chemical attack by the alkaline environment of curing cement. Glass and polyester fibers also degrade due to the alkaline environment of the curing cement matrix. Polyethylene homopolymers or polypropylene homopolymers, copolymers or terpolymers have been explored, as have various surfactants for fiber coating. Additionally fibers made from polymer alloys have been suggested.

However, despite recent advances, there remains an unmet need in the art to optimize concrete with reinforcing fibers which are able to help reduce the formation and propagation of microscopic cracks in concrete.

SUMMARY

In one form the present disclosure is directed to a cementitious mixture, comprising a mineral cement and synthetic, low-crystallinity copolymer microfibers.

In another form, present disclosure is directed to a cementitious mixture, comprising a mineral cement and microfibers which comprise a first population of microfibers formed from at least a first synthetic, low-crystallinity copolymer and a second population of microfibers formed from a second synthetic, low-crystallinity copolymer, different from said first copolymer, wherein monomers forming said different copolymers are selected to provide different physical characteristics to each of said different synthetic, low-crystallinity copolymers.

In another form, the present disclosure is directed to a process for reinforcing a cementitious matrix, comprising adding polymeric microfibers comprising one or more synthetic, low-crystallinity copolymers to a cementitious pre-mixture containing a mineral cement.

DETAILED DESCRIPTION

Described herein is a reinforced cementitious matrix, such as a reinforced concrete, and a process for formulating such a matrix.

All numerical values within the detailed description and the claims herein are modified by "about" or "approximately" the indicated value, and take into account experimental error and variations that would be expected by a person having ordinary skill in the art.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "contains", "containing", "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Concrete lifetime, durability, and toughness is limited by its resistance to the formation and coalescence of microscopic cracks in the portland cement. According to the present disclosure, strong but ductile semi-crystalline, especially low-crystallinity copolymer microfibers are added to a cementitious mixture, such as concrete, to improve local energy dissipation and prevent crack propagation in the cured concrete. This is accomplished with a combination of crystal plasticity, amorphous network extension and strength, and polar molecule addition or fiber surface treatment for improved adherence to or in the host mineral phase. High pH that evolves during cement curing may convert some polar groups to salts, which have unsurpassed affinity to the host mineral phase. Applications for this microscopically toughened concrete include performance structures (blast-proof), long-life infrastructure, prefabricated civil structures (bridge supports), and to enhance downhole cement curing integrity and blowout prevention.

Inclusion of ductile but strong polymer microfibers into the cementitious material allows the fibers to intersect a nascent or propagating crack and "bridge" it, such that the fibers both dissipate energy with crack opening, and also bear load, which takes the driving force for propagation away from the crack tip. This methodology is part of the fracture toughness strategy of dense bone: low toughness hydroxyapatite mineral is reinforced by a lightly cross-linked collagen fiber matrix, allowing fiber bridging of cracks. Conventional, highly crystalline concrete reinforcing fibers are known to have high tensile strengths, but are relatively brittle. It has been found that use of relatively low-crystallinity copolymers for concrete reinforcement results in a balance of strength properties, wherein the microfibers have good tensile strength, but also good ductility which inhibits breakage of the microfibers during the stress imparted by microscopic cracking of concrete both during curing and subsequently during stresses induced by such as overhead vehicular traffic, when the reinforced concrete is used as a road surface.

The microfibers advantageously have an affinity for the host mineral phase to enhance adherence to the mineral phase and to transmit stress without pulling out under local tension. In the case of polyolefins, this requires some functionalization such that the polymer, or at least the microfiber surfaces thereof have exposed polar groups in sufficient density. This can be accommodated with such as maleated chemistries or the like, or with simple Corona plasma surface treatment of the fibers.

The microfibers can be spun using solution spinning, melt extrusion or any other fiber spinning technique which is suitable for making fibers having diameters less than about 1 mm. Suitable fiber diameters can be less than about 0.5 mm (500 μm), or less than about 100 μm, such as from about 10 μm to about 100 μm, or from about 20 μm to about 60 μm. The spun microfibers, which are generally continuous when spun, can be chopped into smaller fibers, since if they are too long they can ball-up during the process of mixing of the wet concrete and will not reinforce as fibers. However, if they are too short, they will not bridge cracks. Accordingly, the chopped fibers will have an aspect ratio (i.e. length/diameter) which is optimized to have both adequate length to bridge microscopic cracks in concrete and adequate diameter to impart sufficient resistance to balling up or otherwise bending. The optimum aspect ratio will depend on the polymer chemistry and the level of crystallinity of the polymer microfibers so-formed. The microfibers can be formed, stored and shipped as nonwoven fabrics, and subsequently chopped into suitable staple fiber lengths at the location of mixing or use.

The polymers used to form the microfibers have at least some level of crystallinity, but not high enough crystallinity to render the microfibers brittle. In this manner, the microfibers will have some ductility, which acts to resist fiber breakage upon application of the tensile forces incurred in the curing concrete matrix, as well as those incurred subsequent to curing due to loading of the concrete surface, such as that applied to a road surface by vehicular traffic. In this way, even if microscopic cracks are formed, the reinforcing microfibers will survive the cracking and reduce propagation of the microscopic cracks. It is advantageous if the synthetic, low-crystallinity copolymer microfibers have a ductility greater than about 50%, as measured by strain to failure.

The low-crystallinity microfibers of the present disclosure also result in improvements as compared to amorphous microfibers, which can break when drawn by the tensile forces of the concrete matrix. In contrast, due to having some level of crystallinity, the microfibers of the present disclosure will dissipate the energy imparted by the cracking concrete matrix, without breaking, and can even demonstrate an increase in breaking resistance when stretched to near a maximum elongation.

One form the present disclosure is directed to a cementitious mixture, comprising a mineral cement, and synthetic, low-crystallinity copolymer microfibers. Mineral cements are inorganic materials which when combined with water can bind other materials together. Suitable mineral cements for use in the presently disclosed compositions include Portland cements, pozzolan-lime cements, slag-lime cements, supersulfated cements, calcium sulfoaluminate cements and any other natural cements. As is well-known in the art, mineral cements can contain a wide variety of inorganic compounds, including $SiO_2$, $Al_2O_3$, $Fe_2O_3$, $CaO$, $MgO$ and $SO_3$, most or all of which are modified to ionic species in the presence of water added to cure the cement. Additionally, it is well-known that during curing, cement mixtures can reach very alkaline pH, even as high as pH 13 or more.

The presently disclosed cementitious mixtures can be mixed in the dry or wet states, and can be further mixed with conventional additives, including one or more of sand, fly ash, fine and/or coarse aggregates, blast furnace slag, pozzolans, fumed silica, wetting agents, air entrainers, air detrainers, corrosion inhibitors, set accelerators or set retarders, depending upon the desired applications for the cured concrete product. Optimization of fiber loading can be ascertained by well-known methods, and can vary based upon the chemical and physical nature of the microfibers selected for inclusion and the desired characteristics of the wet and/or cured concrete.

The synthetic, low-crystallinity copolymer microfibers useful in the presently disclosed cementitious mixtures can be spun from any copolymer which demonstrates at least some low level of crystallinity. By "copolymer" is meant a polymer which is composed of at least two or more comonomer components. The copolymers can be two-component polymers (di-polymers), or even three-component polymers (terpolymers), or the like. The copolymers are synthetic, formed by polymerization of the selected monomer components, or even by modification of naturally occurring polymers. Examples of such copolymers include random or non-random ethylene or propylene copolymers comprising from about 0.5 mol % to about 25 mol %, or from about 1 mol % to about 10 mol %, or from about 2 mol % to about 8 mol %, or even from about 3 mol % to about 7 mol % of one of ethylene or propylene monomeric units, and from about 75 mol % to about 99.5 mol % of the other.

The crystallinity of these copolymers can be "tuned" to be within a desired range, such as from about 1% to about 60%, even from about 5% to about 45%, or even from about 10% to about 30%, as measured by Differential Scanning calorimetry, by varying the ratio of the ethylene and/or propylene co-monomers or other backbone defects such as tacticity or branching. Alternatively, a low crystallinity copolymer can be formed by copolymerizing ethylene or propylene with an alpha, beta-unsaturated carboxylic acid or anhydride, such as maleic acid or maleic anhydride, which acts to reduce the normally high level crystallinity of polyolefin.

Advantageously, the copolymers of the present disclosure are formulated such that the microfibers formed therefrom have exposed polar groups having chemical affinity with minerals present in curing or cured cementitious mixtures. For example, the spun microfibers can be plasma-treated to form polar groups, such as hydroxyl groups, on the surfaces thereof, or can be formulated to include repeating units of at least two different monomer compounds, wherein at least one of the monomer compounds has terminal polar groups. Such polar group-containing monomers include the above-mentioned alpha, beta-unsaturated carboxylic acids or anhydrides, such as maleic acid or maleic anhydride, or unsaturated organic sulfonic acids, or their salts or ester derivatives. The polar group-containing monomers can be selected to have both hydrophobic and hydrophilic moieties, such as where the molecules have a hydrophobic (non-polar) moiety on one end and a hydrophilic (polar) moiety on the other end. When copolymerized with relatively non-polar, hydrophobic monomers such as ethylene and/or propylene, the polar group of these monomers will preferentially bloom to the surface of the copolymer during polymerization in a known manner, and the resulting spun microfibers will have polar groups on the surfaces thereof.

In a particularly advantageous form, the copolymer can be an ionomer. The term "ionomer" or "ionomer resin" means an extrudable resin comprising repeating units of both electrically neutral repeating units and a fraction of ionized units (usually no more than 15 mole percent) covalently bonded to the polymer backbone as pendant group moieties, which can be ionically cross-linked by neutralizing at least a part of a carboxyl group in an ethylene/unsaturated carboxylic acid copolymer, such as cross-linked ethylene-methacrylic acid and ethylene-acrylic acid copolymers, with a cationic species, such as $Ca^{++}$, $Mg^{++}$, $Mn^{++}$, $Co^{++}$, $Ni^{++}$, $Cu^{++}$, $Zn^{++}$ and $Pb^{++}$, or the like.

It is possible that there may be no single fiber composition that will adequately reinforce cementitious compositions against microscopic cracking at all use temperatures, but an ensemble of materials with varying thermal properties could span the range. In this regard, the present disclosure is directed to a cementitious mixture, comprising a mineral cement and microfibers which comprise a first population of microfibers formed from at least a first synthetic, low-crystallinity copolymer and a second population of microfibers formed from a second synthetic, low-crystallinity copolymer, different from said first copolymer, wherein monomers forming said different copolymers are selected to provide different physical characteristics to each of said different synthetic, low-crystallinity copolymers. Each "population" of microfibers includes a collection of microfibers which can have substantially the same diameters and aspect ratios, but are spun from different low-crystallinity copolymers. Alternatively, the at least two populations of microfibers can be selected to have different physical characteristics.

For example, the different populations of microfibers can be selected to have differing diameters and aspect ratios, and/or differing thermal characteristics, such as differing softening temperatures, and/or differing crystallinities, and/or differing tensile strengths or ductilities and/or differing stiffnesses. In this way the ultimate cured cementitious composition can be engineered to have enhanced resistance to microscopic cracking at different temperatures, such as is encountered by vehicular roadways during different times of day and different seasons of the year, as compared to cementitious compositions having only a single population of microfibers. Instead, by utilizing at least two different microfiber populations, the combined thermal and strength characteristics of the microfibers in each population can be optimized for different temperature ranges, such as by modifying the monomer components and/or concentrations of each population, or by varying the microfiber diameters and/or aspect ratios.

Accordingly, it can be advantageous if the first synthetic, low-crystallinity copolymer and the second synthetic, low-crystallinity copolymer have softening temperatures which differ by at least about 10° C., such as where a first synthetic, low-crystallinity copolymer has a softening temperature of from about −20 to about 0° C., and a second synthetic, low-crystallinity copolymer has a softening temperature of from about 20 to about 40° C., and wherein the different synthetic, low-crystallinity copolymers have different strain-hardening capacities as measured by the maximum tensile stress attainable after substantial ductile drawing. The softening temperature can then be defined as the highest temperature where substantial strain-hardening is observed (ultimate stress greater than the ductile flow stress). For example, each population of microfibers can have differing ultimate tensile strength at a given temperature by over 50%, even if each is roughly equivalent when tested at its respective softening temperature. Additionally, the microfiber characteristics can be optimized by including microfiber populations in which the synthetic, low-crystallinity copolymers of the microfibers each have different crystallinities in ranges from about 1% to about 60%, even from about 5% to about 45%, or even from about 10% to about 30%, as measured by Differential Scanning calorimetry, by varying the ratio of the ethylene and propylene co-monomers or other backbone defects such as tacticity or branching.

In some forms it can be advantageous if the monomer composition of the fibers is selected to include cross-linkable components, such as for example non-conjugated dienes, alkoxysilanes, vinyl sulfonyls, or other such cross-linkable groups. In this manner the microfibers can be lightly cross-linked after formation of the microfibers to improve their toughness, prior to mixing into a wet or dry cementitious composition. The cross-linkable groups can be either those which can be cross-linked by radiation, or by addition of external compounds suitable to cross-link the groups, such as peroxides or the like.

In one example, a preferred material formulation is a lightly crosslinked Vistamaxx™, a propylene-based polymer, with as high a crystallinity as possible. In the absence of crosslinks, a very high molecular weight copolymer may suffice. This imparts both high viscosity and some resistance to degradation from the local environment. Further, at high temperatures (summer road surface) it may be that the microfibers have little strength due to softening. Crosslinking or high viscosity may limit damage to the microfibers such that they continue functioning under a wide variety of conditions.

An additional form of the presently disclosed disclosure is directed to a process for reinforcing a cementitious matrix, comprising adding polymeric microfibers comprising one or more synthetic, low-crystallinity copolymers to a cementitious premixture containing a mineral cement. As described above, it can be particularly advantageous if the polymeric microfibers comprise at least a first population of microfibers formed from a first synthetic, low-crystallinity copolymer and a second population of microfibers formed from a second synthetic, low-crystallinity copolymer, different from said first copolymer, the monomers of each different copolymer being selected to provide different physical characteristics to each of said different synthetic, low-crystallinity copolymers. In this way the cementitious compositions can be optimized to have different microfibers made of different synthetic, low-crystallinity copolymers which have different thermal characteristics, such as different softening temperatures, different ductilities, different tensile strengths, and the like.

While the present disclosure has been described and illustrated by reference to particular forms, those of ordinary skill in the art will appreciate that the disclosure lends itself to variations not necessarily illustrated herein. For this reason, then, reference should be made solely to the appended claims for purposes of determining the true scope of the present disclosure.

What is claimed is:

1. A cementitious mixture comprising:
   a mineral cement; and
   a first population of microfibers formed from a first synthetic copolymer and a second population of microfibers formed from a second synthetic copolymer, different from said first copolymer, wherein both the first and second synthetic copolymers comprise from about 1 mol % to about 25 mol % of one of ethylene or propylene monomeric units, and from about 75 mol % to about 99.5 mol % of the other of ethylene or propylene monomeric units.

2. The cementitious mixture of claim 1, which is a wet or a dry mixture.

3. The cementitious mixture of claim 1, which is a cured concrete.

4. The cementitious mixture of claim 1, wherein the microfibers have exposed polar groups having chemical affinity with minerals present in curing or cured cementitious mixtures.

5. The cementitious mixture of claim 1, wherein at least one of the microfibers is lightly cross-linked by being subjected to radiation.

6. The cementitious mixture of claim 1, wherein said microfibers have diameters of less than about 1 mm and aspect ratios from about 5:1 to about 50:1.

7. The cementitious mixture of claim 1, further comprising one or more of sand, fly ash, fine and/or coarse aggregates, blast furnace slag, pozzolans, fumed silica, wetting agents, air entrainers, air detrainers, corrosion inhibitors, set accelerators or set retarders.

8. A process for reinforcing a cementitious matrix comprising adding polymeric microfibers to a mineral cement to form a cementitious premixture, wherein the polymeric microfibers comprise a first population of microfibers formed from a first synthetic copolymer and a second population of microfibers formed from a second synthetic copolymer, different from said first copolymer, and wherein the first and second synthetic copolymers both comprise from about 1 mol % to about 25 mol % of one of ethylene or propylene monomeric units, and from about 75 mol % to about 99.5 mol % of the other of ethylene or propylene monomeric units.

9. The process of claim 8, wherein the microfibers have exposed polar groups having chemical affinity with minerals present in curing cementitious mixtures.

10. The process of claim 8, wherein at least one of the microfibers is lightly cross-linked by being subjected to radiation.

11. The process of claim 8, wherein said microfibers have diameters of less than about 1 mm and aspect ratios from about 5:1 to about 50:1.

12. The process of claim 8, further comprising adding one or more of sand, fly ash, fine and/or coarse aggregates, blast furnace slag, pozzolans, fumed silica, wetting agents, air entrainers, air detrainers, corrosion inhibitors, set accelerators or set retarders to said cementitious premixture.

13. The process of claim 8, wherein the cementitious premixture is a wet or a dry mixture.

* * * * *